United States Patent
Theodore

(10) Patent No.: US 12,145,863 B2
(45) Date of Patent: Nov. 19, 2024

(54) SYSTEM AND PROCESS FOR OBTAINING POTABLE WATER EMPLOYING GEOTHERMAL ENERGY

(71) Applicant: Louis Theodore, East Williston, NY (US)

(72) Inventor: Louis Theodore, East Williston, NY (US)

( * ) Notice: Subject to any disclaimer, the term of this patent is extended or adjusted under 35 U.S.C. 154(b) by 279 days.

(21) Appl. No.: 17/736,239

(22) Filed: May 4, 2022

(65) Prior Publication Data

US 2022/0356077 A1  Nov. 10, 2022

Related U.S. Application Data

(60) Provisional application No. 63/184,945, filed on May 6, 2021.

(51) Int. Cl.
| | |
|---|---|
| *C02F 1/04* | (2023.01) |
| *C02F 1/26* | (2023.01) |
| *F24T 50/00* | (2018.01) |
| *C02F 103/08* | (2006.01) |

(52) U.S. Cl.
CPC .............. *C02F 1/043* (2013.01); *C02F 1/265* (2013.01); *F24T 50/00* (2018.05); *C02F 2103/08* (2013.01)

(58) Field of Classification Search
CPC .... C02F 1/04; C02F 1/043; C02F 1/14; C02F 1/16; C02F 2103/08; F24T 50/00
See application file for complete search history.

(56) References Cited

U.S. PATENT DOCUMENTS

| | | | |
|---|---|---|---|
| 4,656,831 A | 4/1987 | Budininkas et al. | |
| 4,725,359 A | 2/1988 | Ray | |
| 6,907,845 B2 | 6/2005 | Krebs | |
| 7,389,639 B2 | 6/2008 | Michalakos et al. | |
| 7,607,303 B2 | 10/2009 | Ramakrishnan et al. | |
| 8,017,366 B1 | 9/2011 | Schuh et al. | |
| 8,307,896 B2 * | 11/2012 | Sarria | F24T 10/17 166/57 |
| 8,413,420 B1 | 4/2013 | Zaromb | |
| 8,511,072 B2 | 8/2013 | Judkins et al. | |

FOREIGN PATENT DOCUMENTS

| | | | | |
|---|---|---|---|---|
| FR | 2847571 A1 | 5/2004 | | |
| WO | WO-2022170386 A1 * | 8/2022 | ............. | F03G 4/001 |

* cited by examiner

*Primary Examiner* — Renee Robinson
(74) *Attorney, Agent, or Firm* — Dilworth & Barrese, LLP

(57) ABSTRACT

A system and method for converting non-potable water into potable water. Non-potable water, such as sea water or non-potable ground water, and the like, is fed down a conduit into a deep underground enclosure. Due to its extreme depth, the enclosure is geothermally heated above the boiling point of water at the pressure within the enclosure. The water boils and creates water vapor. The water vapor rises and can be drawn up through a vapor conduit to the surface. The water vapor can be condensed (and further purified, if necessary) into potable water. The steam can be used in a hybrid system, and condensed after being used for heating purposes or electrical production. Prior to being sent down into the enclosure, the source of non-potable water can be used in counter current heat exchange to reduce the temperature of the water vapor rising through the vapor conduit.

9 Claims, 2 Drawing Sheets

SYSTEM AND PROCESS FOR OBTAINING POTABLE WATER EMPLOYING GEOTHERMAL ENERGY

CROSS REFERENCE TO RELATED APPLICATIONS

This application claims priority to, and the benefit of provisional application Ser. No. 63/184,945, filed May 6, 2021, the contents of which are incorporated herein by reference.

BACKGROUND OF THE INVENTION

The invention relates to a system and process for obtaining potable water, and more particularly to a system and process employing geothermal energy to provide the energy needed to purify non-potable water.

The world's total water supply is enormous, compared to presently conceivable human needs. The oceans are vast. Yet, there is a growing shortage of potable water that is free from excess contaminants, salts and other chemicals. About ninety-nine percent of the 320 million cubic miles of water in or on the earth's crust is salty and useful neither for irrigation nor for the majority of society's other needs by present techniques. Other water is contaminated with organic and inorganic contaminants. One way to increase potable water availability is to develop processes for obtaining potable water from seawater or non-potable ground water. These processes typically employ membrane separation, evaporation, crystallization and so forth. However, despite significant efforts, prior attempts have fallen short of widespread acceptability and the worldwide need for potable water is growing.

Many states have established standards for classifying water as potable. These standards involve placing limits on any contamination by pathogens, such as bacteria, chemicals such as benzene, and salts such as sodium chloride. As used herein, the term potable water means that the water is sufficiently free from pathogens, restricted chemicals, and salts, in order to comply with any federal drinking water standards, and the standards of the State of New York.

The dissolved salt in much of the naturally available water makes recovering natural potable water a worldwide challenge. Water that is "saline" contains significant concentrations of dissolved salts; the most common is sodium chloride (NaCl). In this case, the concentration is the amount (by weight) of salt in water, as expressed in "parts per million" (ppm). If water has a concentration of 10,000 ppm of dissolved salts, then 10,000 divided by 1,000,000 of the weight of the water (1%) comes from dissolved salts.

Common parameters for saline water vary, and include:
Fresh water—Less than 500-1,000 ppm salt
Slightly saline water—From 1,000 ppm to 3,000 ppm salt
Moderately saline water—From 3,000 ppm to 10,000 ppm
Highly saline water—From 10,000 ppm to 35,000 ppm
Ocean water commonly contains about 35,000 ppm of salt.

As used herein, the term potable water will mean water that contains under 750 ppm dissolved salts.

One way to increase potable water supplies is to develop processes for obtaining potable water from seawater or other non-potable water reserves. These processes typically employ reverse osmosis (membrane separation), evaporation or crystallization. These processes can be highly energy intensive and costly. Consequently, despite significant efforts, prior attempts to commercialize processes for converting non-potable water into potable water have fallen short of widespread acceptability.

It is therefore desirable to provide new processes for providing potable drinking water that avoid the drawbacks of prior processes.

SUMMARY OF THE INVENTION

Generally speaking, in accordance with the invention, an improved system and method is provided for converting non-potable water into potable water. Non-potable water, such as seawater or non-potable ground water, and the like, is pumped down a liquid conduit into deep underground enclosures. Due to their extreme depth, these enclosures are geothermally heated above the boiling point of water at the pressures encountered within these enclosures. Therefore, the water pumped into these enclosures will boil into water vapor (steam). Water vapor (typically pure water) will rise by natural convection through a vapor conduit to the surface, and can also be drawn up with a blower; in effect it can rise from convection or it can be drawn up with a blower. At this point, the water vapor can be condensed into potable water and further purified, if necessary. In certain embodiments of the invention, the source of non-potable water can be used to save cooling energy and reduce the temperature of the water vapor rising through the vapor conduit, by placing the non-potable water in heat exchange contact with the water vapor, prior to this non-potable water being sent down into the enclosure.

In accordance with the invention, a passageway can extend from the surface of the Earth, down to an underground enclosure, the enclosure at a temperature above the boiling point of water. A hollow vapor receiving conduit pipe can extend down the passageway, to the enclosure. The pipe should have an external diameter less than the diameter of the passageway, so as to define an annular space therebetween. The aqueous solution (non-potable water) can be fed down the annular space, between the pipe and the passageway, so that it flows all the way down into the underground enclosure. Alternatively, it can be sent down through a pipe. The aqueous solution reaching the enclosure will be geothermally heated (boiled) to form water vapor. The hollow vapor receiving pipe is constructed, positioned and adapted to conduct the water vaper from the underground enclosure, up to the Earth's surface. A blower assist or other vacuum system can also be employed. After reaching the surface, at least a portion of this water vapor can then be condensed, such as with a heat exchanger or battery of heat exchangers. The incoming flow of the aqueous solution can be used as a cooling source (heat sink) as part of the heat exchange. Undesirable components that were included in the vapor stream, and remain in the condensed vapor can also be removed, such as with a molecular sieve or other known water purification process. A hot solution, such as a hot brine solution may accumulate at the bottom of the enclosure. Optionally, the solution can be withdrawn through an additional passageway.

Thus, a new system and process are provided, whereby potable water can be obtained from seawater or other sources of non-potable water at any salinity or other contamination, by evaporation means, employing geothermal energy to boil the non-potable water. The geothermal energy is used to evaporate the water into steam. Various cooling methods can then be employed to condense the steam into potable water. Seawater, especially seawater from deep sources, can be used as at least part of the cooling medium in a counter current heat exchange configuration. Various evaporative cooling and/or refrigeration methods can also be used.

Other advantages and objects of the invention will be apparent from the drawings and descriptions to follow.

BRIEF DESCRIPTION OF THE DRAWINGS

The following drawings are presented for illustration only, and should not be considered to limit the scope of the invention.

DETAILED DESCRIPTION OF THE PREFERRED EMBODIMENTS

Figure 1:
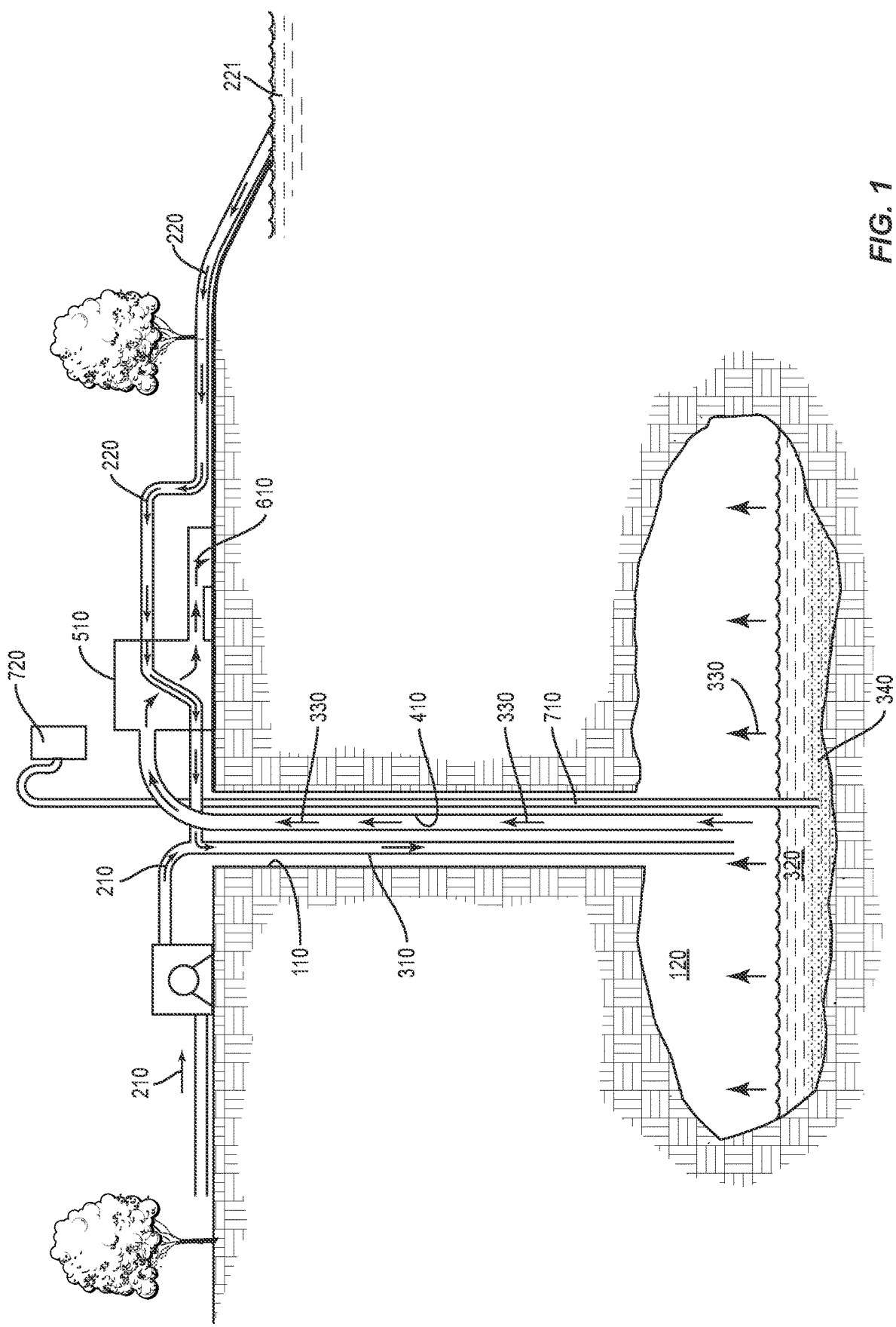
FIG. 1 is a schematic view of a water purification system and method in accordance with a preferred embodiment of the invention.

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The majority of the geothermal resources located in the United States are in the following western states: California; New Mexico; Arizona; Utah; Nevada; Washington; Oregon; and Idaho. Eighty percent of the 3,000 MW of current geothermal energy is located in California, where nearly 50 geothermal plants provide nearly 5 percent of the state's electricity. In general, these geothermal resources may be compartmentalized into three main categories:

1. Hydrothermal resources are underground reservoirs of hot water and/or steam.
2. Hot dry rock resources are typically at about 3-mile depths, with little or no fluid present.
3. Geopressured resources are hot saline fluids found at very high pressures in porous formations. These are believed to contain large amounts of dissolved natural gas, and the production of natural gas and heat may be equally important.

Seismically active hotspots are not the only places where geothermal energy can be found. There is a steady supply of milder heat—useful for direct heating purposes—virtually in any location on Earth at depths of anywhere from ten to a few hundred feet below the surface. In addition, there is a vast amount of heat energy available from dry rock formations deeper below the surface (4-10 km). Some of the emerging technologies have been able to capture this heat for electricity production. When geothermal reservoirs are located near the surface, they can be reached by drilling wells. Some wells are more than 2 miles deep.

A usual way of extracting the energy from geothermal sources is to tap into naturally occurring hydrothermal convection systems where (cooler) water seeps into the Earth's crust, is heated up, and then rises to the surface. When heated water and/or steam is forced to the surface, it is a relatively simple matter to capture that steam and use its energy to drive electric generators. These geothermal power stations are not dissimilar to other steam turbine thermal power stations: heat from the Earth's core is used to heat water or another working fluid. The working fluid is then used to turn a turbine, which then employs a generator to produce electricity. The fluid is then usually cooled and returned to the heat source in a closed loop system.

At present, geothermal wells are rarely more than 2 miles deep. Upper estimates of geothermal operations have reported wells as deep as 6 miles. Drilling at this depth is now possible, although it can be an expensive process. The deepest well in the world several years ago was 7 miles deep. The challenges facing engineers are to drill wide holes at minimum cost and to disengage rocks. Production wells are drilled once a reservoir has been located. Hot water and steam—at temperatures of 300° F. to 700° F.—are extracted to the surface and used to generate the aforementioned electricity at power plants near the production wells.

Drilling techniques have advanced a long way since the early days of oil prospecting. The original drill worked like a pile driver, hammering a hole into the rocks, but modern drills employ a circular motion to do a much neater and faster job. It has led to the design of a completely different, more sophisticated type of drilling, using teeth made from diamonds or tungsten carbide, which provide the hardness necessary to crush and chip any kind of rock likely to be encountered within the drilling operations. With this technique, it is possible to drill through more than 1,000 feet in a few hours. During the last few decades, new techniques have been developed.

Much has recently appeared in the literature regarding Eavor-Loop's process of extracting power from the Earth's geothermal energy. (https://eavor.com/about/technology, incorporated herein by reference). The Eavor-Loop is a closed system within which a working fluid is contained and circulated. The working fluid is not fluid from a reservoir flowing into the well. It is a fluid added to a closed-loop to create an efficient radiator, much like a vehicle radiator circulates fluid in a closed loop to remove heat from a gasoline engine. The working fluid naturally circulates without requiring an external pump due to the thermosiphon effect of a hot fluid rising in the outlet well and a cool fluid falling in the inlet well. However, this process, referred to by Eavor as a "radiator" is essentially a known heat pipe mechanism.

Flynn, Akashige, and Theodore (Kern's Process Heat Transfer, $2^{nd}$ edition, Scivener-Wiley, 2020), incorporated herein by reference, described a heat pipe heat-transfer device as one that combines the principles of both thermal conductivity and phase transition to efficiently manage the transfer of heat between two interfaces.

Figure 2:
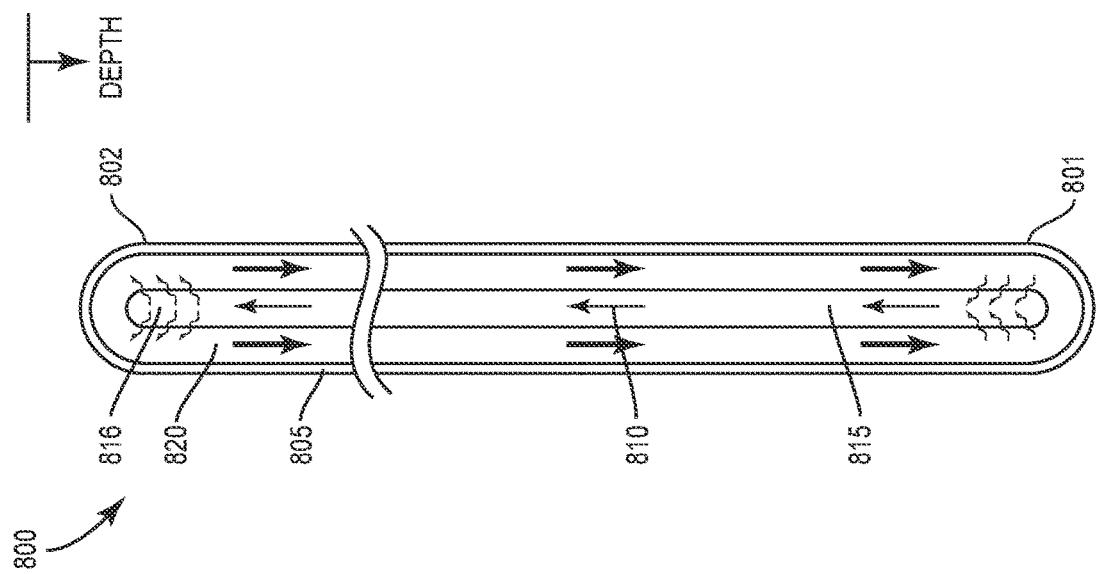
FIG. 2 is a schematic view of a heat pipe for using geothermal heat to boil non-potable water.

As shown in FIG. 2, a heat pipe 800 includes a hot lower end 801 and a cool upper end 802 within a casing 805. When geothermal heat is applied to lower end 801, a fluid 810 in a hollow core 815 as a vapor cavity 816 becomes heated, evaporates, and heated fluid 810 rises by convection towards upper end 802. Heat pipe 800 can include a wick 820, chosen for compatibility with both the heat pipe material of construction and the temperatures of the hot and cold surfaces. Fluid 810 heats and evaporates. As evaporating fluid 810 fills the heat pipe's hollow center 815, it diffuses axially along its length. Condensation of the downstream vapor occurs wherever the temperature is even slightly below that of the evaporation area. As it condenses, the vapor gives up the latent heat it acquired during evaporating and establishes a reverse vapor flow pattern in the pipe. The condensed liquid flows through capillary action within wick 820, back to the heat source, completing the closed-loop heat transfer cycle.

Heat is removed to boil non-potable surface water into steam. This steam can be condensed to potable water. The withdrawn heat cools the internal fluid, which then flows down, back into the earth, where it is geothermally heated, and the cycle repeats, to transfer the geothermal heat to the Earth's surface and boil non-potable water. Thus, the process itself consists of three operating sections:

1. an evaporator section
2. an adiabatic section
3. a condenser

The net result of the cyclic process is that the heat transferred in the evaporator section is rejected out in the condenser section; in effect, the transfer of heat occurs without direct contact of the source and receiver. These heat pipes are therefore capable of transferring geothermal heat from deep in the Earth to the Earth's outer surface.

Heat pipes have been employed within computer systems to transfer heat from CPU's to heat sinks so the heat can be transferred to the environment. Heat pipes are also used in HVAC systems to recover heat by transfer from an exit stream to a fresh air stream in the winter and to cool an entering air stream in the summer.

In accordance with the invention, seawater (or another aqueous solution) is introduced into an opening at the Earth's surface, and down into a deep enclosure at a natural geothermal temperature above the boiling point of water. Steam is subsequently generated at these great depths due to high underground temperatures, i.e., the presence of geothermal energy. Addition horizontal cavities at various depths can be included to increase the contact area for transferring heat from the hot underground geothermal sources to the downward flowing seawater. The steam output that results from the vaporization process passes upward through the annular region of a shaft opening (or otherwise) and can be recovered at or above ground level in the liquid state by any of a host of traditional condensation means.

Thus, the seawater flows downward by gravity to a depth where the temperature of the Earth is greater than that of boiling water. Some of the seawater may pass through the shaft opening and ultimately empty into a large cavern or dome (a deep enclosure such as an arched chamber of great hollow space/volume) from which the water is evaporated from the seawater (see also FIG. 1) and condensed via any of a host of heat exchange methods. The hot concentrated brine solution that remains at the bottom of the cavern will continue to evaporate until only salt remains. (Alternatively, the hot brine solution may be withdrawn and returned to the surface through a separate conduit located at the bottom.

The application of the aforementioned heat pipe principle can also be applied to provide the geothermal energy at any location in the shaft where seawater is evaporated. The resulting steam is (once again) condensed by any convenient method.

It is also an objective of the invention to not only examine all the options that are available to obtain the water from the process and develop suitable methods to achieve this objective but also examine other modifications to the potable water process.

Finally, it is also proposed to employ the natural hybrid nature of the process. Hybrid processes have traditionally been defined as those that are either operating in series or in parallel. Unfortunately, the term hybrid has come to mean different things to different people, and a prevalent definition is one in which two or more processes produce different products. For this proposed process, geothermal energy is produced by known methods for heating/electricity purposes in one part of the process and purified potable water is produced and extracted in a second process, downstream from the heat/electricity process. Thus, the first process in this hybrid system is referred to as an energy/power process and the second a potable water process. Non-potable water can be fed into the Earth, geothermally converted to steam, the steam can be used for heating and/or electricity, and then condensed into potable water.

Potable water can be obtained (as described above and herein) by employing geothermal energy to evaporate non-potable water and provide a source of steam that can be condensed into potable water. A similar process employing geothermal sources as heat sources has been employed by both the electric power industry and home heating processes. Specific details regarding the process of the invention are similar to those associated with power plants currently employing geothermal resources for the source of energy. The process can either provide heat for industrial/commercial heating applications or be converted to electricity using convection heat to power engines, e.g., a heat pump. The proposed process essentially employs a similar system where the fluid is seawater (or another aqueous solution). The net effect of the process is that geothermal energy provides the necessary heat to create essentially pure water as steam from the seawater with the resulting steam condensed into purified potable water via any of a host of heat exchange methods.

The operation of this process may be viewed as consisting of the following four steps:

1. Seawater (or an aqueous solution) is introduced at the top of a shaft opening.
2. Seawater proceeds down the shaft by gravity until it reaches a depth where the water will evaporate and form steam due to the extremely high temperatures present at these depths.
3. The steam flows upward through the shaft to a condenser.
4. The steam is condensed, producing potable water.

The heat pipe principle described earlier may also be employed to provide the energy in the form of heat to evaporate seawater and produce potable water.

No discussion of a geothermal application would be complete without addressing potential environmental concerns. Geothermal sources have a reputation for being "clean" reservoirs of energy, but traditional geothermal development has numerous potential environmental impacts, including air, water, and noise pollution, as well as land subsidence and induced seismic activity. A number of non-condensable gases can also be released to the atmosphere during the drilling, testing, and operational phases of traditional geothermal plant development. The nature and quantity of these emissions are site-specific since the chemical composition of the seawater can vary from location to location. Technologies are available for controlling geothermal pollution in most cases and for mitigating other environmental effects. Most pollutants are inorganic and can be subjected to physical and/or chemical treatment where necessary. The costs of their application to any expected large discharges may be high, however, and in a few cases might be limiting. On the whole, the environmental problems in geothermal development are not complex. The pollutants are not "exotic" since they are contained in the raw geothermal fluid and are natural constituents derived from rock and mineral components dissolved in water. Geothermal energy conversion does not materially change these constituents, except for the removal of heat.

Heat flux from the Earth's surface has been estimated to be 0.063 W/m$^2$. Since the Earth's surface is $510 \times 10^{12}$ m$^2$, the total heat flow amounts to $32 \times 10^{12}$ W. Only 1 percent of this total can be attributed to heat transfer by convection. The total amount of heat stored within the Earth is of the order of $10^{31}$ J. Most of this quantity of energy is unfortunately not presently available through any technical means. The present energy consumption of the Earth is in the order of $2 \times 10^{20}$ J. The heat flow rate to the surface by conduction is approximately 30-40 terawatts (TW). This energy is replenished by internal radioactive decay at a rate of approximately 30 TW. This nuclear process has been going on since the Earth's formation and will effectively continue for many millennia. However, there are environmental concerns associated with this process.

Approximate temperature data is available at various locations within the Earth as well as the boiling temperature of water corresponding to these pressures. This information is provided in Table 1 and Table 2, respectively.

TABLE 1

Approximate Temperatures at Various Depths

| Depth | Temperature, °F. |
|---|---|
| Surface | 50 |
| 1,000 ft | 65 |
| 1 mile | 130 |
| 1.5 miles | 130 |
| 2.0 miles | 212 |
| 10 miles | 850 |

TABLE 2

Approximate Boiling Temperatures at Various Depths

| Depth | Pressure, atm | Boiling Temperature, °F. |
|---|---|---|
| Surface | 1 | 212 |
| 1,000 ft | 30 | 445.9 |
| 1 mile | 157 | 655.9 |
| 1.5 miles | 218 | 705 |
| 2.0 miles | 280 | — |
| 5.0 miles | 675 | — |
| 10 miles | 1300 | — |

For the near future, energy from primarily deep geothermal resources will be employed to obtain geothermal energy. The economics of these energy systems are still not fully understood and only those sources/processes that promise the lowest initial costs will be marketable. For example, geothermal heat pumps can generally extract enough heat from shallow ground anywhere in the world to provide some form of home heating, but many industrial applications require the higher temperatures of deep resources since the thermal efficiency and profitability of electricity generation is particularly sensitive to temperature. Future new geothermal activities will probably include the injecting of seawater, as described in this patent, directly into a well in the magma, heating the fluid.

The Earth's geothermal resources are theoretically more than adequate to supply humanity's energy needs, but only a very small fraction may be profitably exploited at this time. Unfortunately, drilling and exploration for deep resources is very expensive. Forecasts for the future of traditional geothermal power depend on assumptions about technology energy process existing subsidies and the value of money (interest rates). However, employing the aforementioned geothermal energy for desalination appears to be an attractive process.

A system and method for producing potable water in accordance with preferred embodiments of the invention is shown schematically with reference to FIG. 1. In one embodiment of the invention, a large orifice 110 is formed deep into the Earth, terminating in a large underground enclosure 120. Due to its depth, the temperature in enclosure 120 is above the boiling point of water at the pressure within the enclosure. A first source of non-potable water 210 is pumped into orifice 110 and flows downward, to enclosure 120. In one embodiment of the invention, non-potable water 210 flows through a conduit 310, which extends down into enclosure 120. In other embodiments of the invention, the water is brought to the top of orifice 110, and falls downward, unenclosed.

A pond of water 320 is formed in enclosure 120. Due to the high temperature within enclosure 120, the water therein vaporizes, and forms an upward flow of water vapor 330. Any dissolved salts and other impurities will fall to a bottom 340 layer of enclosure 120. A water vapor conduit 410 extends from enclosure 120 up, through orifice 110. Water vapor conduit 410 is adapted to receive water vapor 330 in enclosure 120. Water vapor 330 will rise to the surface of water vapor conduit 410 through natural convection. In another embodiment of the invention, a blower or other pumping mechanism can be used to enhance the flow of water vapor 330 up conduit 410. Water vapor 330 is then fed to a condensation mechanism 510, which can include one or more heat exchange units. Condensation mechanism 510 condenses at least some of water vapor 330 into a stream of liquid water 610. Liquid water 610 may be sufficiently potable on its own, or may require known purification methods, based on the impurities of non-potable water 210, or any impurities introduced within enclosure 120.

In another embodiment of the invention, the source of non-potable water can be a source of cold salt water 220, such as from an ocean 221. Cold salt water 220 from ocean 221 may be at a cold temperature. Therefore, cold salt water 220 can be run counter current to water vapor 330 in condensation mechanism 510, to help reduce energy costs. In FIG. 1, cold salt water 220 is shown mixed with non-potable water 210, for purposes of convenience and illustration. In other embodiments of the invention, only one source of non-potable water will be utilized, and the potable water may, or may not be used as part of the condensation process. In FIG. 1, sources 210 and 220 are shown in a combined process, for convenience.

In still another embodiment of the invention, a brine extraction tube 710 can be used to draw liquid from bottom layer 340, up to a tank 720 on the surface. This extraction of material, such as strong brine, resulting from the evaporation of water vapor from the non-potable water 210 or 220 sent to enclosure 120 is optional, depending on the circumstances of enclosure 120 and water source 210 or 220.

Note that where this application has listed the steps of a method or procedure in a specific order, it may be possible, or even expedient in certain circumstances, to change the order in which some steps are performed, and it is intended that the particular steps of the method or procedure claim set forth below not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A method for obtaining purified potable water from a non-potable aqueous solution, comprising the steps of:
   providing a passageway extending from the surface of the Earth to an underground enclosure at a temperature above the boiling point of water within the enclosure;
   inserting a water vapor receiving conduit through the passageway from the surface to the underground enclosure, the water vapor receiving conduit having an external diameter less than the diameter of the passageway so as to define an annular space therebetween;
   feeding the aqueous solution down the annular space between the conduit and the passageway so that it flows into a pool within the underground enclosure; and heats to form water vapor above the pool within the enclosure;
   the water vapor above the pool in the enclosure flows up the water vapor receiving conduit to the surface; and
   condensing at least a portion of the water vapor rising from the enclosure to the surface into potable water.

2. The method of claim 1, and comprising the step of purifying the condensed water vapor.

3. The method of claim 1, and comprising withdrawing a residue of the evaporated aqueous solution.

4. The method of claim 1, wherein the aqueous solution is in heat exchange contact with the water vapor, to withdraw heat from the water vapor as part of the condensing of the water vapor.

5. The method of claim 1, wherein the aqueous solution is seawater.

6. The method of claim 1, wherein the aqueous solution is fed down the passageway through a pipe.

7. The method of claim 1, wherein the water vapor is drawn from the enclosure to the surface with a blower.

8. The method of claim 1 wherein the passageway to the underground enclosure is at least 2 miles deep.

9. The method of claim 1, wherein the underground enclosure is a naturally occurring enclosure.

* * * * *